United States Patent Office 3,519,404
Patented July 7, 1970

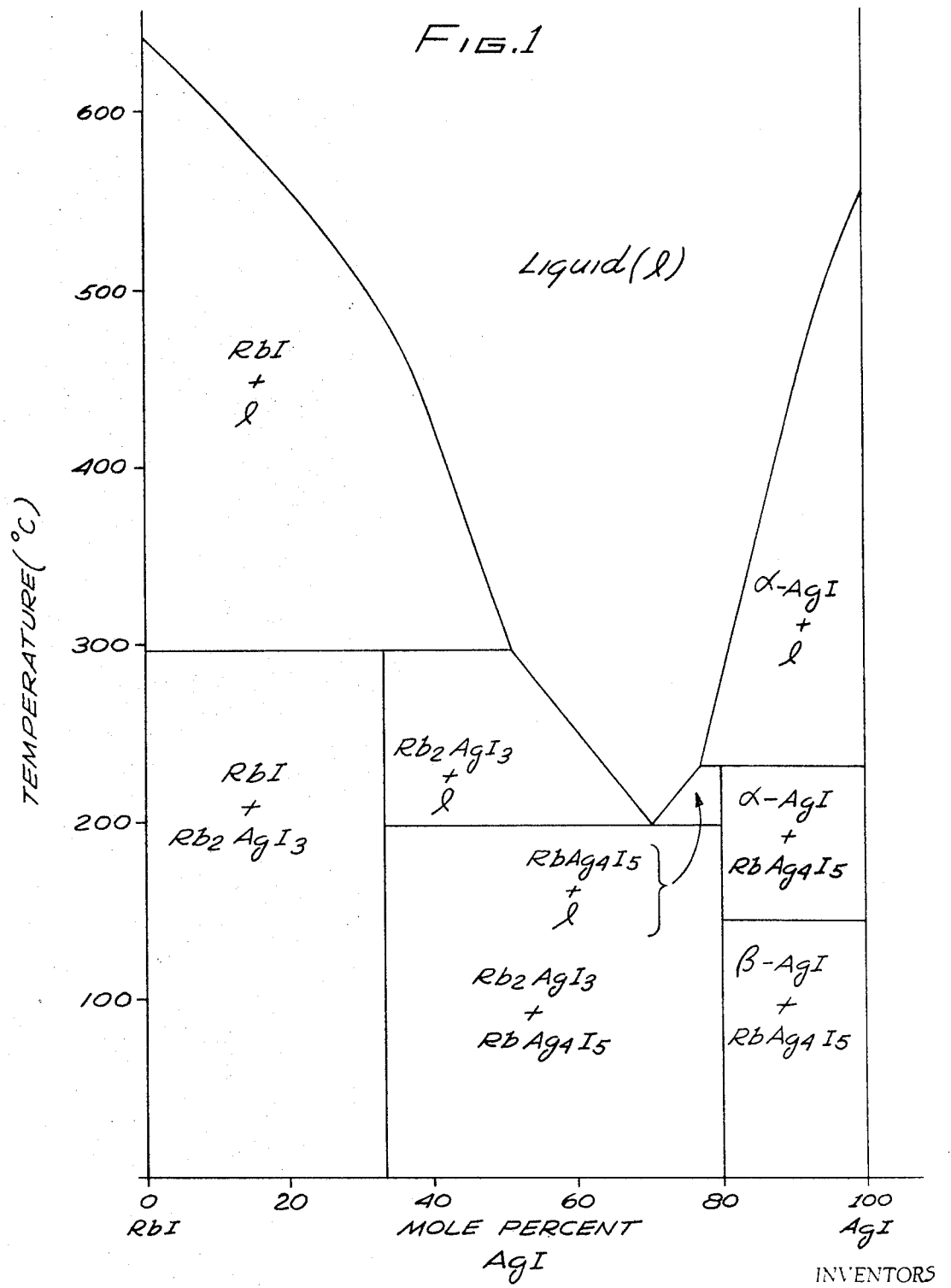

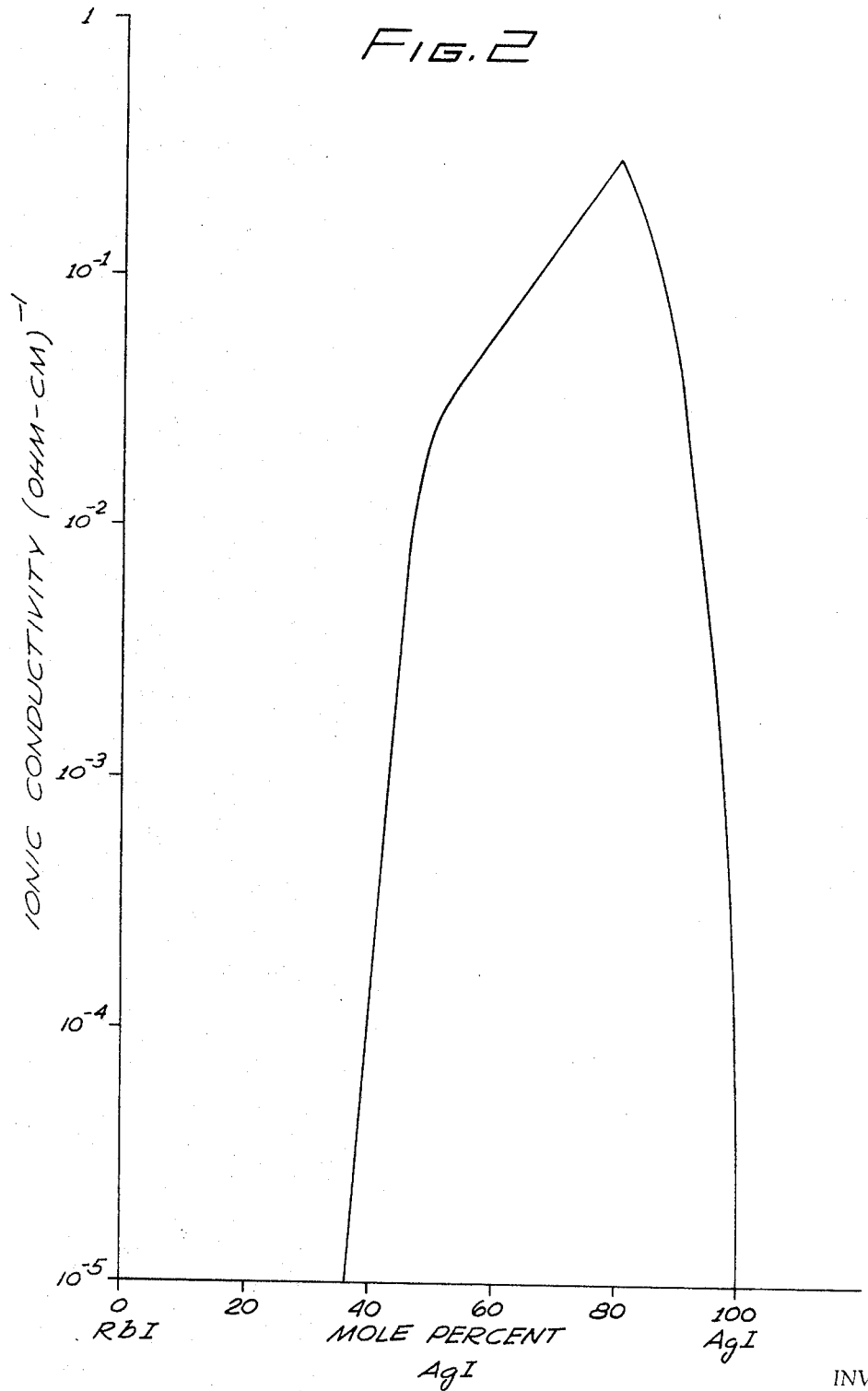

3,519,404
SOLID IONIC CONDUCTORS
Gary R. Argue, Woodland Hills, and Boone B. Owens, Calabasas, Calif., assignors to North American Rockwell Corporation, a corporation of Delaware
Continuation of application Ser. No. 569,193, Aug. 1, 1966, which is a continuation-in-part of application Ser. No. 526,700, Feb. 11, 1966. This application Apr. 17, 1969, Ser. No. 817,299
Int. Cl. C01d *3/12, 11/04;* H01b *1/00;* H01m *39/04*
U.S. Cl. 23—367
18 Claims

ABSTRACT OF THE DISCLOSURE

A solid ionic conductor containing as conductivity-imparting component a single-phase solid compound having the formula $MAg_4I_5$, wherein M is a univalent ion consisting of K, Rb, $NH_4$, or combinations thereof. Cs may be present as a minor constituent of M together with at least one of K, Rb, and $NH_4$.

---

This application is a continuation of application Ser. No. 569,193, filed Aug. 1, 1966, and now abandoned, which is a continuation-in-part of application Ser. No. 526,700, filed Feb. 11, 1966 and since abandoned.

This invention relates to conductive compositions of matter. It particularly relates to solid materials having unusually high ionic conductivity.

Solid ionic conductors are known and are of particular utility as the electrolyte in a solid state electric cell. The silver halides have been found useful as such solid electrolytes. One device employing silver iodide as a solid electrolyte is described in U.S. Pat. No. 2,689,876, "Solid Ion Electrolyte Battery." However, the usefulness of such a device, particularly at room temperature, is principally limited by the low ionic conductivity of the solid electorlyte. For example, the ionic conductivity at room temperature of the silver halides, e.g., AgBr, AgCl, AgI, is about $10^{-6}$ (ohm-cm.)$^{-1}$, i.e., about one micromho/cm. This order of ionic conductivity results in solid state cells having too high an internal resistance for many battery and other applications. Attempts have been made to enhance the ionic conductivity of the silver halides by adding tellurium to these salts. See U.S. Pat. No. 2,930,830. However, only a relatively small improvement in conductivity is obtained in this manner.

More recently, Takahashi and Yamamoto have reported in the Journal of the Electrochemical Society of Japan, vol. 32, pp. 664–7 (1964), a solid state electric cell of much lower internal resistance; this cell uses $Ag_3SI$ as an electrolyte. The reported conductivity of this electrolyte at room temperature (25° C.) is approximately $10^{-2}$ (ohm-cm.)$^{-1}$, which is about $10^4$ times greater than that of silver iodide. Although this conductivity of $Ag_3SI$ is markedly higher than that of the silver halide solid ionic conductors, the need still exists for stable solid ionic conductors of higher ionic conductivity.

Accordingly, it is an object of the present invention to provide solid materials of high ionic conductivity.

It is a further object to provide conductive compositions of matter having unusually high ionic conductivity over a wide temperature range.

It is a further object to provide ionically conductive compositions of matter particularly suitable for use in solid state devices.

It is still another object to provide methods for preparing these unusually high ionically conductive compositions of matter in high purity.

In the earlier filed application, Ser. No. 526,700, since abandoned, there was provided an ionically conductive composition of matter having the formula $MAg_3I_4$, M being selected from the class consisting of K, Rb, $NH_4$, and combinations thereof. It has since been discovered in an intensive study of the system MI-AgI—using X-ray structural analysis, phase diagram studies, microscopic examination of annealed mixtures, and electrical conductivity measurements in relation to composition—that the conductivity-imparting component of the MI-AgI system is a single-phase solid compound having the formula $MAg_4I_5$ (MI·4AgI). Thus the ionically conductive composition of matter having the empirical formula $MAg_3I_4$ (MI·3AgI) is actually a multiphase mixture of the high conductivity compound $MAg_4I_5$ and of a high resistivity component which may include $M_2AgI_3$ and MI. It has further been found that cesium ions may substitute in the crystal lattice for a minor portion of the K, Rb, and $NH_4$ ions.

Accordingly, in the present invention, there is provided an ionically conductive composition of matter wherein the conductivity-imparting component has the formula $MAg_4I_5$ where M is a univalent ion selected from the class consisting of K, Rb, $NH_4$, Cs, and combinations thereof, Cs being present only as a minor constituent of M, i.e., less than 50 ion percent of M, together with at least one of K, Rb, and $NH_4$. Thus, there are provided as novel solid ionic conductors and electrolytes, the compounds $KAg_4I_5$, $RbAg_4I_5$, and $NH_4Ag_4I_5$. Furthermore, these compounds are isomorphous, show identical X-ray diffraction patterns, and may be combined in any desired proportions. M, for example, may be made up of $K_a$, $Rb_b$, $(NH_4)_c$, and $Cs_d$, where the sum of $a, b, c,$ and $d$ is equal to one, and $a, b,$ and $c$ may have individual values from zero to one, inclusive, and $d$ may vary from zero to one half. It has been found, for example, that when M is composed of both potassium and rubidium, varying in atomic percent from 10 to 80 K and from 90 to 20 Rb, the ionic conductivity of the resultant solid solution in air at room temperature is substantially constant over the entire range of composition.

The ionic conductivities of the compositions of matter of this invention, and particularly of the conductivity-imparting components thereof, are markedly higher than those of the best known solid ionic conductors at or near room temperature and desirably show a negligible electronic conductivity. At 35° C., the conductivity of the composition of matter having the empirical formula $KAg_3I_4$ is 0.16 (ohm-cm.)$^{-1}$. That of the conductive component thereof, $KAg_4I_5$, at 20° C. is 0.20 (ohm-cm.)$^{-1}$. The conductivity at 25° C. of the composition of matter having the empirical formula $RbAg_3I_4$ is 0.18 (ohm-cm.)$^{-1}$. The conductive component thereof, $RbAg_4I_5$, has a conductivity value of 0.20 (ohm-cm.)$^{-1}$ at 20° C., as has also $NH_4Ag_4I_5$. The electronic conductivity of the compounds $KAg_4I_5$, $RbAg_4I_5$, and $NH_4Ag_4I_5$ is essentially negligible, being less than $10^{-8}$ (ohm-cm.)$^{-1}$, or less than 1 part per million of total conductivity. Therefore we shall refer to the total electrical conductivity in these materials as an ionic conductivity. Compared with silver iodide, whose ionic conductivity is of the order of $10^{-6}$ (ohm-cm.)$^{-1}$, the ionic conductivities of the materials of this invention are from $10^5$ to $10^6$ times higher. Compared with the best of the known materials, viz., $Ag_3SI$, the ionic conductivities of the materials of this invention, at or near room temperature, are higher by a factor of about 20.

The high ionic conductivity of the materials of this invention enables their use in electrochemical devices for many different and varied applications. Basically, these electrochemical devices include a solid electrolyte element in combination with means for transferring electric current through the solid electrolyte by a flow of ions therethrough. Illustrative of such electrical devices are solid state electrochemical timers, coulometers, and adaptive computer components, as well as solid state electric cells and batteries. In each of these devices there is a flow of electric current by a movement of ions through the solid electrolyte element, an associated electrode acting as an electron acceptor and another associated electrode acting as an electron donor. Solid state electric cells using the solid electrolytes of this invention have particularly low values of internal resistance.

As a consequence of their superior ionic conductivity, the materials of this invention when used as thin-film electrolytes produce cells having a lower internal resistance than those made with comparably thin films of the known materials. Alternatively, cells may be prepared using thicker layers of electrolyte of the materials of this invention and yet present no greater internal electrical resistance than cells made with considerably thinner layers of the hitherto known solid ionic conductors. Solid state electrochemical devices utilizing the ionically conductive compositions of this invention are more specifically described and claimed in our copending application Ser. No. 573,743, "Solid State Electrochemical Devices," filed Aug. 1, 1966 and assigned to the assignee of this invention.

For a more complete understanding of this invention, its objects, features, and advantages, reference should be had to the accompanying drawing in which:

FIG. 1 is a phase diagram of the system RbI–AgI, and

FIG. 2 is a graphical representation of the ionic conductivity of the RbI–AgI system at 20° C.

Although the importance and need for solid ionic conductors of high ionic conductivity has been recognized, and the silver halides and $Ag_3SI$ have been known and considered useful as suitable ionic conductors, other suitable solid ionically conductive compositions of matter have not been made available. Several phase diagram studies of a contradictory nature have been reported in the scientific literature relating to some of the molecular constituents used as reactants to form the conductive compositions of this invention. For example, according to the phase diagram of the RbI–AgI system, reported by Sandonnini, in Atti reale accad. Lincei, Sez. I, 24, 201 (1912), no compound is formed at the composition RbI·4AgI or RbI·3AgI, although a eutectic was formed at this latter composition, melting at 196° C. In the study by Marsh and Rhymes, reported in J. Chem. Soc. (London) 103, 781–6 (1913), double salts of silver iodide with the alkali-metal iodides are described. A solution was obtained in acetone of AgI with RbI or KI in the proportion of one mole of RbI or KI to 3 moles of AgI. The whole solution, if not too dilute, froze to a solid mass when cooled to below 0° C. No analyses of possibly formed salts were made. However, Ishii, Osaka Imp. Ind. Research Inst. (Japan) 11, No. 20 (1931), reported formation of the complex salt 4AgI·KI·2 acetone, followed by loss of acetone on standing.

In a study by Dombrovskaya and Koloskova, "A Singular Irreversible Reciprocal System with the Stratifying of Silver and Potassium Nitrates and Iodides," Izvestia Sektora Fiziko-Khimicheskogo Analiza 22, 178 (1953), cooling curves of various mixtures in the KI–AgI system were obtained. A transition point in the cooling curve was noted at 267° C. These workers concluded that the composition KI·3AgI would not represent a compound, as had been suggested in a 1914 study by Sandonnini, but believed that a compound would exist at KI·4AgI. No such compound was actually isolated nor were any measurements made of electrical conductivities in the system. In a subsequent study, Burley and Kissinger, J. Res. U.S. Natl. Bu. Stud., 64A, 403–4 (1960), investigated the phase diagrams of the systems KI–AgI and NaI–AgI because of interest in cloud-seeding experiments using smokes of these materials. They reported that a compound $KA_3I_4$ having a melting point of 268° C. was formed, although no mention of its conductivity was reported.

Attempts were made to measure the conductivity of several different mixed salt systems by Fischer, Z. Elektrochem. 32, 136 (1926). Among these, the system KI–AgI was measured at 145° C. at various concentrations. The conductivity of AgI alone at this temperature is about 0.8 $(ohm-cm.)^{-1}$, although Fischer reported results ranging from about $1\times10^{-4}$ to $2\times10^{-3}$ $(ohm-cm.)^{-1}$ for 60–80 percent and 50 and 90 percent AgI, respectively.

Referring to the phase diagram shown in FIG. 1, the system RbI–AgI is graphically shown as a plot of temperature vs. mole percent AgI. As may be noted from the phase diagram, starting with zero percent AgI, compound formation first occurs at 33⅓ mole percent AgI. The formed compound, whose molecular formula is $Rb_2AgI_3$, has a peritectic temperature of 297° C. This compound is highly resistive and shows a lower conductivity than that of either RbI or AgI alone. As the mole percent AgI increases, compound formation is observed at 80 mole percent AgI, corresponding to a molecular formula of $RbAg_4I_5$ and having a peritectic temperature of 230° C. This compound (as well as its potassium and ammonium analogs) is the most conductive of any solid ionic conductors heretofore known, having an ionic conductivity at 20° C. of 0.20 $(ohm-cm.)^{-1}$. It is noted from the phase diagram that at a temperature below the eutectic temperature and at a composition corresponding to 75 mole percent AgI, a mixture of two solid phases is present, $Rb_2AgI_3$ plus $RbAg_4I_5$, rather than a true single-phase compound which would have the molecular formula $RbAg_3I_4$.

The following equation for the mixture may be postulated:

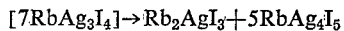

$$[7RbAg_3I_4] \rightarrow Rb_2AgI_3 + 5RbAg_4I_5$$

The empirical formula $MAg_3I_4$ is enclosed in brackets to show that this composition of matter is not a single-phase compound. It is noted from the above equation that a mixture corresponding to the empirical formua $RbAg_3I_4$ contains almost 85 mole percent of the conductivity-imparting composition $RbAg_4I_5$; such a mixture is found to have an ionic conductivity only slightly less than that of $RbAg_4I_5$.

In FIG. 2 is shown a graphical representation of the specific conductivity of the RbI-AgI system at 20° C. in air plotted on a semilogarithmic scale. As may be noted from the diagram, a maximum in the conductivity curve appears at 80 mole percent AgI, which corresponds to the molecular composition $RbAg_4I_5$. However, conductivity values of $1\times10^{-3}$ $(ohm-cm.)^{-1}$ and higher are characteristic of compositions ranging from about 43 to about 98 mole percent AgI. Such conductive compositions of matter are highly useful in that their conductivity values are still substantially above that shown by pure AgI.

Essentially similar results to those shown in FIG. 2 are obtained for the KI-AgI and $NH_4I$-AgI systems in an inert atmosphere. Thus the conductive compositions of matter falling within the scope of this invention may also be expressed as including the compositions of the MI-AgI system for AgI values from about 43 to about 98 mole percent. Expressed in terms of relative molar ratios, MI·$n$AgI, $n$ will have values ranging from about 0.75 to about 49 for these conductive compositions, with single-phase compound formation occurring at $n=4$ (80 mole percent AgI; $MAg_4I_5$). For the KI-AgI system, $n$ may have a value as low as 0.2 and still provide a useful conductive composition.

The conductivity-imparting compounds of this invention may be prepared by several synthetic methods. However, for many applications it may be more convenient because of greater ease of preparation to prepare conductive compositions of matter which are mixtures containing the conductivity-imparting compounds. Thus the conductivity-imparting compounds ordinarily need not be prepared or isolated in a high degree of purity for many applications in which they are used.

To prepare the conductive compounds by a solid-state salt reaction at annealing temperatures, silver iodide is reacted with one or more of the iodides of potassium, rubidium, and ammonium, cesium iodide being optionally present in minor amount, in appropriate molar ratio of four parts silver iodide to one part MI, M being selected from K, Rb, $NH_4$, and combinations thereof, and may include a minor amount of Cs. The materials are intimately mixed together, e.g., by grinding, preferably pelletized, and then annealed at a temperature below the fusion temperature. X-ray analysis shows that reaction occurs to form the desired $MAg_4I_5$.

For a fused salt reaction, a similar molar ratio is used, and the stoichiometric mixture is heated until it is molten. The melt is briefly stirred and rapidly quenched. The sample is then annealed at a temperature below the melting point. A preferred method for obtaining essentially all single-phase product is to carry out the combined melt-anneal synthesis as described, followed by repulverizing, compacting, and annealing of the product.

For reaction at a lower temperature, such as at room temperature, an appropriate preselected organic solvent is used. A stoichiometric mixture, as above described, is added to a low-boiling solvent, and then most of the solvent is removed by distillation. After substantial removal of the organic solvent, the desired compound is generally precipitated as an organic multiphase complex with the solvent. However, after the solvate is decomposed by further distillation, the desired single-phase pure compound is not obtained. Instead, the conductive composition of matter isolated from the solvent is found to consist of at least a two-phase mixture, with the pure conductivity-imparting compound predominant. Illustratively, in an attempted acetone preparation of the compound $RbAg_4I_5$, the solid which initially crystallizes out as the acetone solvent is removed by distillation has the empirical formula $RbAg_3I_4 \cdot 2$ acetone. This solid, when heated or exposed to air, undergoes a disproportionation reaction

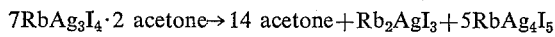
$7RbAg_3I_4 \cdot 2$ acetone$\rightarrow 14$ acetone$+Rb_2AgI_3+5RbAg_4I_5$ Thus, the resultant solid product that is obtained in this manner is a two-phase mixture containing 83.3 mole percent of the high-conductivity compound ($RbAg_4I_5$) and 16.7 mole percent of the high-resistivity compound ($Rb_2AgI_3$). This conductive composition of matter, although a two-phase mixture, still has a very high ionic conductivity.

The choice of suitable organic solvent may be readily determined by routine experimental evaluation. Both salts need not necessarily be soluble in the solvent, but only the final reaction product. A preferred class of organic solvents consists of those having the formula R—CO—R, i.e., the ketones. These solvents are particularly effective when M is K or Rb. Particularly preferred as organic solvent among the aliphatic ketones is acetone because of its effectiveness, ready availability, low price, and low-boiling point. The low temperature reaction is usually preferred for the preparation of the conductive compositions of this invention because the use of elevated temperatures required for the fused salt reaction is less convenient than recovery from a solvent. The organic solvent technique offers further advantages with respect to the preparation of thin films, preparation of intimately mixed materials of high conductivity, and elimination of undesirable impurities that are insoluble in the organic solvent.

It has been found that although the electrical conductivities of AgI, AgBr, and AgCl are substantially of the same order of magnitude, only the silver iodide compound may be used as a reactant to form highly conductive compositions according to this invention. For example, where attempts were made to react silver chloride with either potassium chloride or rubidium chloride, no reaction yielding a conductive composition was found to occur. The resulting mixture of salts had a high resistivity substantially equivalent to that of the silver chloride, and X-ray diffraction patterns showed the typical pattern for silver chloride. Similarly, when attempts were made to react silver iodide with sodium iodide, again no reaction occurred, the resistivity approximated that of AgI, and the X-ray diffraction pattern for AgI was present. By contrast, when the conductivity-imparting compounds of this invention are produced, their X-ray diffraction patterns do not show the presence of the reactant constituent materials such as AgI, and only a single-phase material is present for the pure compound $MAg_4I_5$.

The compound $RbAg_4I_5$ appears to be the most stable of the conductivity-imparting compounds. Thus, while $RbAg_4I_5$, $KAg_4I_5$, and $NH_4Ag_4I_5$ are decomposable by water vapor, the latter two compounds are unstable in a normal laboratory atmosphere and require storage in an inert atmosphere. However, these pure compounds may be stabilized by admixture with quantities of desiccant materials which only slightly affect the conductivity but markedly enhance the stability of these compounds in the presence of moisture.

The conductive compositions of this invention show relatively small degradation in conductivity over a wide temperature range from very low temperatures to the melting temperature of the composition. For example, the ionic conductivities of $KAg_4I_5$ and $RbAg_4I_5$ were determined for temperatures ranging from $-150°$ C. to $145°$ C. At $-150°$ C., the conductivity was about $0.001$ (ohm-cm.)$^{-1}$. At $-70°$ C., the conductivity was about $0.04$ (ohm-cm.)$^{-1}$. At $145°$ C., the ionic conductivity had increased to about $0.7$ (ohm-cm.)$^{-1}$. Thus, the stability of these compounds with respect to ionic conductivity, particularly at low temperatures, make them highly useful over a wide temperature range, from about $-150°$ C. to their peritectic temperatures.

A variety of materials may be used to dilute the active conductivity-imparting compound without causing undue loss of the desired conductivity. In addition, the diluent material may be selected to add other desired properties to the conductive compound. Accordingly, for many applications the conductivity-imparting compounds will not be used in the pure state but will be present as mixtures which yield conductive compositions of matter. Thus, the starting reactant materials, i.e., MI and AgI, used for preparing the conductive compounds may be present in the final conductive composition of matter without unduly lowering the ionic conductivity. In admixture with a compound having the formula $MAg_4I_5$, approximately up to 40 mole percent MI or 80 mole percent AgI may be present ($2MI \cdot 3MAg_4I_5$ to $MAg_4I_5 \cdot 4AgI$) without unduly reducing the ionic conductivity. The reason for this is that although the ionic conductivities of AgI and MI are poorer than that of $RbAg_4I_5$ by a factor of at least 100,000, the conductivity paths of the two compounds in a mixture are effectively almost parallel ones; the resultant ionic conductivity will therefore be only slightly lowered. It is also feasible, by deliberately preparing mixtures of the conductive compounds with suitable and selected amounts of AgI or MI or other nonreactive low ionic conductivity materials dispersed therein, to obtain an ionic conductor having a wide range of ionic conductivity, varying from $10^{-6}$ to approximately $0.20$ (ohm-cm.)$^{-1}$. Thereby considerable flexibility is obtained for desired applications of ionic conductors requiring different ionic conductivities.

In preparing conductive compositions of matter which are diluent mixtures with the conductivity-imparting component, the specific conductance of the resultant mixture depends on several factors. If the nonconductive second component is completely inert to the conductive component $MAg_4I_5$, then the volume fraction of the conductive component in the mixture essentially determines the specific conductance of the mixture. In addition, the method of mixing and annealing of the mixture has an effect upon the resultant conductance value. While lithium, sodium, and cesium apparently do not form pure single-phase compounds corresponding to the molecular formula $MAg_4I_5$, M may be partially substituted by cesium in minor amount to form a solid solution with the other phases. Sodium and lithium do not appear to form solid solutions with a stable phase but form multiphase mixtures, the sodium and lithium components acting as essentially high-resistivity inert diluents. Similarly, where the nonconductive diluents are AgI and $Rb_2AgI_3$, the effective conductivity of the resultant mixture appears to be a function of the volume percent of the conductivity-imparting compound in the mixture. Thus, the conductive compounds may be extensively diluted and still be useful and unique as ionic conductors. Other materials such as calcium sulfate, silica, and plastics, e.g., methylmethacrylate polymer, may be added as diluents. These may function as desiccants or, in the case of the plastic molding materials, provide ease in preshaping the ionically conductive composition to a desired configuration. Thus, the plastics and desiccants have considerable practical use in thet preparation of ionically conductive sheets for automatic device manufacture or in increasing the stability of the electrolyte.

As may be noted from the following table, the potassium, rubidium, and ammonium salts may be readily intermixed without degrading the conductivity. The presence of cesium, however, results in a lowering of the conductivity in amounts of 50 mole precent and higher.

TABLE I

| Formula | Conductivity (ohm-cm.)$^{-1}$ | Lattice Constant (Angstrom units) | Peritectic Temperature (° C.) |
|---|---|---|---|
| $KAg_4I_5$ | 0.21 | 11.13 | 253 |
| $RbAg_4I_5$ | 0.21 | 11.25 | 230 |
| $NH_4Ag_4I_5$ | 0.19 | 11.19 | 232 |
| $K_{1/2}Rb_{1/2}Ag_4I_5$ | 0.19 | 11.19 | |
| $K_{1/2}(NH_4)_{1/2}Ag_4I_5$ | 0.22 | | |
| $Rb_{1/2}(NH_4)_{1/2}Ag_4I_5$ | 0.22 | | |
| $K_{1/3}Rb_{1/3}(NH_4)_{1/3}Ag_4I_5$ | 0.21 | | |
| $K_{1/2}Cs_{1/2}Ag_4I_5$ | 0.10 | 11.30 | |
| $Rb_{1/2}Cs_{1/2}Ag_4I_5$ | 0.14 | | |
| $(NH_4)_{1/2}Cs_{1/2}Ag_4I_5$ | 0.11 | | |

When binary compounds were prepared of the formula $M'_{1/2}N_{1/2}Ag_4I_5$ where M' included potassium, rubidium, and ammonium ions and N included lithium or sodium ion, the conductivities obtained were all less than 0.06 (ohm-cm.)$^{-1}$. This would indicate that essentially no lithium or sodium ion entered into the structure $MAg_4I_5$, but served only as an inert diluent.

The following examples illustrate the practice of this invention but are not intended as limitations thereof.

EXAMPLE 1

Preparation of $RbAg_4I_5$ by solid-state anneal

An intimate mixture consisting of 1.4866 g. (0.007 mole) of high purity rubidium iodide in powder form and 6.5736 g. (0.028 mole) of silver iodide (molar ratio AgI/RbI of 4:1) was ground together in a mortar, and then the powders were compacted in a pellet press. The pellet was placed in a Pyrex tube and sealed off under an argon atmosphere. The sample was annealed at a temperature of 170° C. After 17 hours, about one-third of the material had reacted to form $RbAg_4I_5$, as evidenced by X-ray analysis.

EXAMPLE 2

Preparation of $RbAg_4I_5$ by combined melt and solid-state anneal

The starting materials consisted of 2.14 g. (0.01 mole) RbI and 9.44 g. (0.04 mole) AgI (molar ratio AgI/RbI of 4:1). These materials were mixed in a beaker, melted, stirred while molten, quenched on a Pyrex watch glass, ground together in a porcelain mortar, and compacted together in a ½-inch diameter pellet press at a load of 12,000 pounds. The pellet was placed in a Pyrex tube that was sealed off under an argon atmosphere. The sample was then annealed at a temperature of approximately 175° C. for 40 hours. X-ray analysis of this material showed that some of the reactant material was present; however, the major component was $RbAg_4I_5$.

EXAMPLE 3

Preparation of single-phase $RbAg_4I_5$

The melt-anneal synthesis described under Example 2 was followed. The resultant material was then repulverized, compacted, an annealed overnight at 165° C. The X-ray diffraction analysis of material prepared in this manner showed that the product was single-phase $RbAg_4I_5$.

EXAMPLE 4

Preparation of single-phase $KAg_4I_5$ and $NH_4Ag_4I_5$

Using essentially similar techniques as that shown in Example 3, single-phase $KAg_4I_5$ and $NH_4Ag_4I_5$ were prepared with starting materials in a molar ratio of AgI/MI of 4:1. In all cases the resultant products were analyzed by X-ray powder diffractometry to confirm the structures formed.

EXAMPLE 5

Acetone preparation of $RbAg_4I_5$ and $KAg_4I_5$

The starting materials consisted of 24.7 g. AgI (0.105 mole) and 8.50 g. (0.040 mole) RbI. These were dissolved in an acetone solvent. The acetonate that initially crystallized out was heated. After distilling off excess acetone, a multiphase product was obtained. However, the major phase present was observed to be $RbAg_4I_5$ as evidenced by X-ray analysis. A similar method of crystallization from acetone was used to prepared $KAg_4I_5$. This also is a multiphase product, as evidenced by X-ray analysis.

EXAMPLE 6

Preparation from melt of composition having empirical formula $KTg_3I_4[KI \cdot 3AgI]$ An intimate mixture consisting of 7.10 g. (.03 mole) of high purity silver iodide in powder form and 1.67 g. (.01 mole) of potassium iodide in powder form (molar ratio AgI/KI of 3:1) was heated until molten, and then the molten liquid was quenched by pouring onto a watch glass. The resultant composition was a glass-like solid of whitish opaque color. The X-ray pattern of this composition, which was essentially similar for the K, Rb, and $NH_4$ compositions, showed a characteristic peak at about 8 angstroms. The characteristic patterns for the starting materials, AgI and KI, were not observed.

The electrical conductivity of the prepared samples was determined to be essentially ionic in that separate determinations of the component of conductivity that was electronic showed values of approximately $10^{-8}$ (ohm-cm.)$^{-1}$. The ionic conductivity of samples of the freshly prepared composition was 0.16 (ohm-cm.)$^{-1}$, the sample resistance being measured with a 1,000-cycle alternating-current bridge, silver amalgam electrodes being used. Subsequent determinations of ionic conductivity after the samples were allowed to stand at room temperature in air showed values of $10^{-3}$ (ohm-cm.)$^{-1}$ and $10^{-6}$ (ohm-cm.)$^{-1}$.

The variations in ionic conductivity with time appeared to result from an apparatus phase transformation occurring in air at about $35 \pm 10°$ C., the low ionic conductivity material appearing below this temperature and gradually approaching an ionic conductivity about that of AgI. When samples were maintained at temperatures above the apparent phase transformation temperature, the ionic conductivity values were substantially the same high values as were obtained with a freshly prepared composition, about 0.2 (ohm-cm.)$^{-1}$. However, variations in ionic conductivity are more probably due to the occurrence of a water vapor-catalyzed decomposition of the conductive compound.

EXAMPLE 7

Acetone synthesis of composition having empirical formula KAg$_3$I$_4$

In a flask containing 250 ml. acetone, 16.6 g. KI (0.1 mole) and 70.4 g. AgI (0.3 mole) were added. The acetone was heated to reflux temperature and then removed by distillation. A white solid product, empirical formula KAg$_3$I$_4$, was obtained and stored under argon for about a week. It was found to be stable at room temperature in the absence of air or moisture as determined by lack of change in color and by conductivity values. The composition was cooled to liquid nitrogen temperature and brought back to room temperature. The composition was still stable and untransformed. The characteristic X-ray pattern for the composition having the empirical formula KAg$_3$I$_4$ was obtained one week after synthesis. Upon exposure of the sample to moisture, the characteristic line at about 8 angstroms disappeared and the sample color changed to yellow. Thus this composition appears stable in the absence of moisture even at temperatures as low as liquid nitrogen temperature.

EXAMPLE 8

Preparation from melt of composition having empirical formula RbAg$_3$I$_4$[RbI·3AgI]

7.04 g. AgI, (0.3 mole) and 2.12 g. RbI (.01 mole) in powder form were mixed, and the mixture was melted and then quenched. The resultant product was a white solid similar in appearance to the composition having the empirical formula KAg$_3$I$_4$. The ionic conductivity of the product was determined between zero and 25° C. The values obtained were as follows, (ohm-cm.)$^{-1}$: 0° C., 0.018; 17° C., 0.11; and 25° C., 0.18. An X-ray pattern was obtained similar to that of the potassium composition, with none of the characteristic lines for AgI or RbI being observed.

EXAMPLE 9

Acetone synthesis of composition having the empirical formula RbAg$_3$I$_4$ 83 g. of AgI and 25 g. of RbI were added to 250 ml. of acetone, and the initial product obtained by fractional crystallization was analyzed by X-ray fluorescence. Its composition was found to correspond to 74.5±.5 mole percent AgI and 25.5±.5 mole percent RbI. The X-ray diffraction pattern was similar to that of the corresponding potassium composition.

EXAMPLE 10

Preparation of composition having empirical formula of NH$_4$Ag$_3$I$_4$ 1.45 g. of NH$_4$I and 7.04 g. of AgI were mixed together, and the mixture was heated until molten and then quenched. Some decomposition was observed during heating. The conductivity of a measured sample at 20° C. was 10$^{-3}$ (ohm-cm.)$^{-1}$.

An attempted synthesis of the ammonium composition from acetone yielded an impure product. Therefore, the melt synthesis method is preferred for the preparation of this conductive composition.

EXAMPLE 11

Preparation of mixed potassium and rubidium conductive composition

The composition corresponding to the empirical formula K$_{1/2}$Rb$_{1/2}$Ag$_3$I$_4$ was prepared by mixing together 1.66 g. KI, 2.12 g. RbI, and 14.09 g. AgI, heating the mixture until a melt was obtained, and then quenching. The conductivity of a 2 g. pellet of one-half inch diameter was determined as 0.2 (ohm-cm.)$^{-1}$ at 20° C. The X-ray pattern was essentially that obtained for the unmixed potassium and rubidium compositions.

EXAMPLE 12

Preparation of mixed conductive compositions

In a similar manner to Example 11, using a melt-quenching technique, conductive compositions of matter were prepared corresponding to the empirical formulas K$_{1/2}$(NH$_4$)$_{1/2}$Ag$_3$I$_4$, Rb$_{1/2}$(NH$_4$)$_{1/2}$Ag$_3$I$_4$, and K$_{1/3}$Rb$_{1/3}$(NH$_4$)$_{1/3}$Ag$_3$I$_4$

EXAMPLE 13

Conductivity as a function of temperature

The ionic conductivities of samples of conductive compositions corresponding to the empirical formulas KAg$_3$I$_4$, RbAg$_3$I$_4$, and NH$_4$Ag$_3$I$_4$ were determined over the temperature range −70° C. to 145° C. under essentially moisture-free conditions. The following results were obtained:

| Composition | Ionic conductivity (ohm-cm.)$^{-1}$ | | | | |
|---|---|---|---|---|---|
| | −70° C. | 0° C. | 20° C. | 100° C. | 145° C. |
| [KAg$_3$I$_4$] | .0013 | .039 | .076 | .35 | .46 |
| [RbAg$_3$I$_4$] | .0049 | .076 | .130 | .32 | .41 |
| [NH$_4$Ag$_3$I$_4$] | .0013 | .025 | .043 | .23 | .44 |

It will of course be understood that many variations may be made with respect to combining different proportions of the conductivity-imparting compounds RbAg$_4$I$_5$, KAg$_4$I$_5$, and NH$_4$Ag$_4$I$_5$, as well as including varying amounts of AgI, RbI, KI, NH$_4$I, CsI, NaI, LiI, or other nonreactive diluent materials as additives to vary the ionic conductivity. Preferably, where a composition having maximum ionic conductivity is desired, the compounds will be prepared in stoichiometric proportions corresponding to MI·4AgI. However, small amounts present of the starting materials or of adventitious impurities will not unduly degrade the ionic conductivity values. Further, certain inorganic compounds such as silica as well as organic polymers and other additives may be included with the pure compounds for purposes of moisture absorption, stability, etc. Thus while we have explained the principle and preferred mode of operation of our invention, according to the Patent Statutes, and have illustrated and described what we now consider to represent its best embodiment, we desire to have it understood that, within the scope of the appended claims, the invention may be practiced otherwise than as specifically illustrated and described.

We claim:
1. A solid-state ionically conductive composition of matter having an ionic conductivity greater than that of silver iodide, said composition consisting essentially of the MI-AgI system for AgI values from about 43 to about 98 mole percent, wherein the conductivity-imparting component is a single-phase solid having the general formula MAg$_4$I$_5$, M being selected from the class consisting of K, Rb, NH$_4$, Cs, and combinations thereof, K being present only in combination and in from 10 to 80 atomic percent of M and Cs being present only in combination and as a minor constituent of M.

2. An ionically conductive composition of matter according to claim 1 wherein the conductivity-imparting component is the compound RbAg$_4$I$_5$.

3. An ionically conductive composition of matter according to claim 1 wherein the conductivity-imparting component is the compound NH$_4$Ag$_4$I$_5$.

4. A single-phase ionically conductive solid of the general formula MAg$_4$I$_5$, M being selected from K, Rb, NH$_4$, Cs, and combinations thereof, K being present only in combination and in from 10 to 80 atomic percent of M and Cs being present only in combination and as a minor constituent of M.

5. An ionically conductive solid according to claim 4 wherein M consists of K in combination with at least one of Rb and $NH_4$, K being present in from 10 to 80 atomic percent of M.

6. An ionically conductive solid according to claim 4 which is $RbAg_4I_5$.

7. An ionically conductive solid according to claim 4 which is $NH_4Ag_4I_5$.

8. A solid-state ionically conductive multiphase complex salt having an atomic ratio of M:3Ag:4I, wherein M is selected from the class consisting of K, Rb, $NH_4$, and combinations thereof, K being present only in combination and in from 10 to 80 atomic percent of M.

9. An ionically conductive multiphase complex salt according to claim 8 wherein M is Rb.

10. An ionically conductive multiphase complex salt according to claim 8 wherein M is $NH_4$.

11. An ionically conductive multiphase complex salt according to claim 8 wherein M consists of K in combination with at least one of Rb and $NH_4$, K being present in from 10 to 80 atomic percent of M.

12. An ionically conductive multiphase complex salt according to claim 11 wherein M consists essentially of from 10 to 80 atomic percent K and from 90 to 20 atomic percent Rb.

13. The method of preparing a single-phase ionically conductive solid of the general formula $MAg_4I_5$ wherein M is selected from the class consisting of K, Rb, $NH_4$, Cs, and combinations thereof, K being present only in combination and in from 10 to 80 atomic percent of M and Cs being present only in combination and as a minor constituent of M, which comprises reacting AgI and MI in a molar ratio of about 4:1 respectively to form $MAg_4I_5$, and recovering the formed $MAg_4I_5$.

14. The method according to claim 13 wherein AgI and MI are intermixed in the solid state in a molar ratio of about 4:1 respectively, M consisting of Rb alone or in combination with K, which is present in from 10 to 80 atomic percent of M, the mixture is heated to the molten state to form $MAg_4I_5$, the mixture is then cooled, and $MAg_4I_5$ is recovered therefrom.

15. The method of preparing a solid-state ionically conductive multiphase complex salt having an atomic ratio of M:3Ag:4I wherein M is selected from the class consisting of K, Rb, $NH_4$, and combinations thereof, K being present only in combination and in from 10 to 80 atomic percent of M, which comprises adding to said solvent AgI and MI in a molar ratio of about 3:1 respectively to an organic solvent, distilling said solvent at a time and temperature sufficient to form said multiphase complex salt, and recovering the formed ionically conductive multiphase complex salt by removal of solvent therefrom.

16. The method according to claim 15 wherein said solvent is an aliphatic ketone.

17. The method according to claim 15 wherein said solvent is acetone and the reactants are maintained under reflux conditions until formation of said multiphase complex salt.

18. The method according to claim 15 wherein M is Rb.

References Cited

UNITED STATES PATENTS

| | | | |
|---|---|---|---|
| 2,944,975 | 7/1960 | Folberth | 23—204 |
| 3,049,406 | 8/1962 | Grant et al. | 23—89 |

OTHER REFERENCES

Dombrovskaya et al.: Chem. Ab., p. 3500 (i), 52 (1958), General and Inorganic Chem., Acad. Sci. U.S.S.R., Moscow.

Burley et al.: Journal of Research of the National Bureau of Standards, A; Physics and Chemistry, vol. 64A, No. 5, pp. 403–404, September-October 1960.

Jacobson: Encyclopedia of Chemical Reactions, vol. VI, 1956, p. 162.

OSCAR R. VERTIZ, Primary Examiner

H. S. MILLER, Assistant Examiner

U.S. Cl. X.R.

23—89, 100; 136—153; 252—518